United States Patent
John et al.

(10) Patent No.: US 7,770,035 B1
(45) Date of Patent: Aug. 3, 2010

(54) METHOD AND APPARATUS FOR PROVIDING POWER TO A COMPUTERIZED DEVICE

(75) Inventors: Sunil S. John, San Jose, CA (US); Tsu-Yau Chuang, Fremont, CA (US); Ramkumar Kariyappa, Santa Clara, CA (US)

(73) Assignee: Cisco Technology Inc., San Jose, CA (US)

( * ) Notice: Subject to any disclaimer, the term of this patent is extended or adjusted under 35 U.S.C. 154(b) by 695 days.

(21) Appl. No.: 11/353,547

(22) Filed: Feb. 14, 2006

(51) Int. Cl.
*G06F 1/26* (2006.01)
*G06F 1/32* (2006.01)
*G06F 1/28* (2006.01)

(52) U.S. Cl. .................. 713/300; 713/310; 713/320; 713/323; 713/324; 713/330; 713/340

(58) Field of Classification Search .............. 713/300, 713/310, 320–324, 330, 340
See application file for complete search history.

(56) References Cited

U.S. PATENT DOCUMENTS

| | | | |
|---|---|---|---|
| 6,496,103 B1 * | 12/2002 | Weiss et al. .............. 375/257 |
| 6,764,343 B2 | 7/2004 | Ferentz ................ 439/620.01 |
| 6,916,206 B2 | 7/2005 | Ferentz ................ 439/620.01 |
| 7,038,918 B2 | 5/2006 | AbuGhazaleh et al. ...... 361/780 |
| 7,040,926 B2 | 5/2006 | Ferentz ..................... 439/676 |
| 7,081,827 B2 | 7/2006 | Addy ....................... 340/693.2 |
| 2004/0025066 A1 * | 2/2004 | Jackson et al. .............. 713/300 |
| 2004/0230846 A1 * | 11/2004 | Mancey et al. .............. 713/300 |
| 2005/0097369 A1 * | 5/2005 | Bowser et al. .............. 713/300 |
| 2005/0201306 A1 * | 9/2005 | Engel ......................... 370/299 |
| 2006/0166706 A1 * | 7/2006 | Dwelley et al. ............. 455/572 |
| 2007/0075586 A1 * | 4/2007 | Bogue ......................... 307/66 |
| 2007/0077819 A1 * | 4/2007 | Thomson et al. ....... 439/620.01 |

* cited by examiner

*Primary Examiner*—Thomas Lee
*Assistant Examiner*—Fahmida Rahman
(74) *Attorney, Agent, or Firm*—BainwoodHuang

(57) ABSTRACT

A data communications network that includes a data communications device and a midspan device where the data communications device directs data to computerized devices, such as IP phones, within the network and the midspan device provides power to the computerized devices. The data communications device and midspan device are electrically coupled such that the data communications device can monitor and control operation of the midspan device using otherwise unused pairs of conductors connecting the data communications device and the midspan device. For example, the data communications device can monitor and control an amount of power transmitted by the midspan device to the computerized devices over the network. Additionally, based upon the monitoring, the data communications device can activate an indicator, such as a visual indicator associated with the midspan device, to provide an indication of an operation state of the midspan device.

20 Claims, 3 Drawing Sheets

METHOD AND APPARATUS FOR PROVIDING POWER TO A COMPUTERIZED DEVICE

BACKGROUND

Conventional networks typically include data communications devices that transmit data packets from one or more sources to one or more destinations. Certain data communications devices, such as routers, receive packets containing data and control information at input ports, and, based on destination or other information included in the packets, route the packets to appropriate output ports that lead to either another router or to the packet's final destination.

Certain networks, such as Voice Over Internet Protocol (VOIP) networks, include multiple Internet-Protocol telephones (IP telephones) connected by one or more routers. These VOIP networks allow the IP telephones to send and receive audio, video, data, and other signals as Internet-Protocol signals. The VOIP networks can also provide power to the IP telephones using power injection or Power Over Ethernet (POE) devices. For example, the IP telephones typically connect to a router using RJ-45 connectors having four pairs of twisted pair conductors used to transmit data. In the VOIP networks, the POE device injects power between the router and the IP telephones and transmits the power over the conductors of the RJ-45 connectors. Because the IP telephones receive power over the computer network from central apparatus, such as the POE device, the IP telephones do not require coupling to external power sources at their respective locations.

SUMMARY

The use of POE devices in conjunction with VOIP networks suffers from a variety of deficiencies. For example, as indicated above, POE devices inject power between routers and networked computerized devices, such as IP telephones. The POE devices, however, operate as stand-alone devices within the network, independent from the operation of the routers. While the POE devices typically provide power through the RJ45 connectors, the routers do not control the amount of power provided by the POE devices. For example, assume a POE device includes four ports, each delivering 15 Watts/port. Because the amount of power provided by the ports of the POE device is not regulated by an external mechanism, such as the router, during operation, the POE device would deliver a total of 60 Watts of power over all four ports. Such power delivery can be costly over time.

Additionally, conventional POE devices do not typically provide feedback as to a state of power delivery between the POE device and a powered device, such as an IP telephone. In such a case, a system operator would not know whether the POE device was properly connected to, or providing power to, the IP telephone over the network.

By contrast to conventional data communications devices, embodiments of the invention are directed to a data communications network that includes a data communications device and a midspan device where the data communications device directs data to computerized devices, such as IP phones, within the network and the midspan device provides power to the computerized devices. The data communications device and midspan device are electrically coupled to allow the data communications device to monitor a status of the midspan device. For example, the data communications device can monitor an amount of power provided by the midspan device to the computerized devices over the network. Based upon the status of the midspan device, the data communications device can control operation of various aspects of the midspan device. For example, the data communications device can control the amount of power delivered by the midspan device to the computerized devices over the network. As such, the data communications device provides external control to the midspan device to reduce an overall amount of power provided by the midspan device over the network, thereby reducing an overall operations cost of the network.

In one embodiment of the invention, a midspan device is configured to provide power to a computerized device. The midspan device includes a first set of multi-terminal connectors configured to electrically couple with a data communications device where the first set of multi-terminal connectors have at least one data terminal configured to receive a data signal from the data communications device and at least one control terminal configured to exchange a control signal with the data communications device. The midspan device also includes a second set of multi-terminal connectors configured to transmit signals to the computerized device where the second set of multi-terminal connectors have at least one data terminal configured to transmit the data signal to the computerized device and at least one power terminal configured to transmit a power signal to the computerized device. In such a configuration, the data communications device can exchange control signals with the midspan device to provide remote monitoring and control of the midspan device (e.g., using otherwise unused pairs of the conductors of the RJ-45 connectors).

In another embodiment of the invention, a data communications device is configured to provide a data signal to a computerized device. The data communications device includes a controller configured to generate a control signal to control operation of a midspan device. The data communications device also includes a set of multi-terminal connectors having at least one data terminal configured to transmit the data signal to the midspan device for delivery to the computerized device and having at least one control terminal configured to transmit the control signal to the midspan device. The data communications device is configured to exchange control signals with the midspan device to provide remote monitoring and control of the midspan device.

In another embodiment of the invention, a data communications system includes a data communications device and a midspan device electrically coupled to the data communications device. The data communications device includes a controller configured to generate a control signal to control operation of a midspan device. The data communications device also includes a set of multi-terminal connectors having at least one data terminal configured to transmit the data signal to the midspan device for delivery to the computerized device and having at least one control terminal configured to transmit the control signal to the midspan device. The midspan device includes a first set of multi-terminal connectors configured to electrically couple with the data communications device where the first set of multi-terminal connectors have at least one data terminal configured to receive the data signal from the data communications device and at least one control terminal configured to exchange a control signal with the data communications device. The midspan device also includes a second set of multi-terminal connectors configured to transmit signals to the computerized device where the second set of multi-terminal connectors have at least one data terminal configured to transmit the data signal to the computerized device and at least one power terminal configured to transmit a power signal to the computerized device.

One embodiment of the invention relates to, in a data communications device, a method for controlling an amount of power delivered to a computerized device by a midspan device. The method includes coupling the data communications device to the midspan device, receiving a reporting signal from the midspan device indicating an amount of power transmitted by the midspan device to the computerized device and in response to the reporting signal, transmitting a control signal to the midspan device to adjust the amount of power provided by the midspan device to the computerized device.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to a data communications network that includes a data communications device and a midspan device where the data communications device directs data to computerized devices, such as IP phones, within the network and the midspan device provides power to the computerized devices. The data communications device and midspan device are electrically coupled such that the data communications device can monitor and control operation of the midspan device using otherwise unused pairs of conductors connecting the data communications device and the midspan device. For example, the data communications device can monitor and control an amount of power transmitted by the midspan device to the computerized devices over the network. Additionally, based upon the monitoring, the data communications device can activate an indicator, such as a visual indicator associated with the midspan device, to provide an indication of an operation state of the midspan device. As such, the electrical coupling between the data communications device and the midspan device allows external control of the midspan device.

Figure 1A:
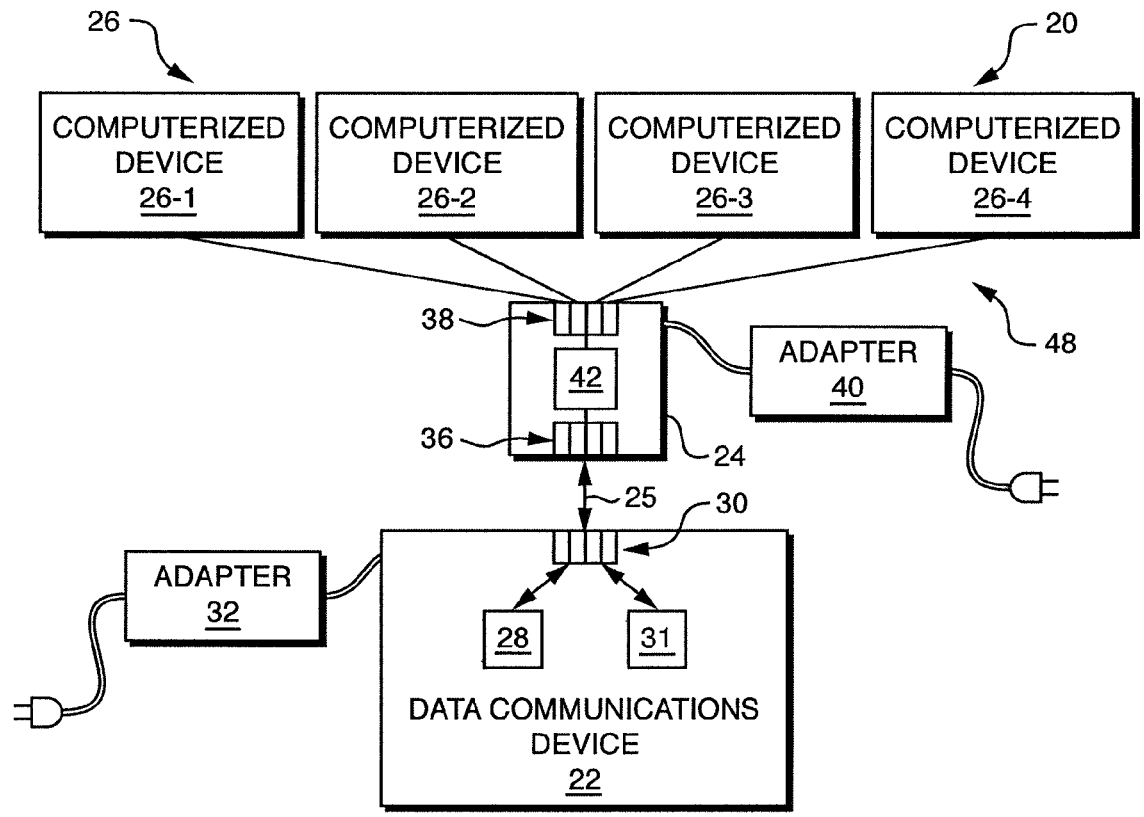
FIG. 1A illustrates a data communications system that includes a data communications device and a midspan device, according to one embodiment of the invention.
Figure 2:
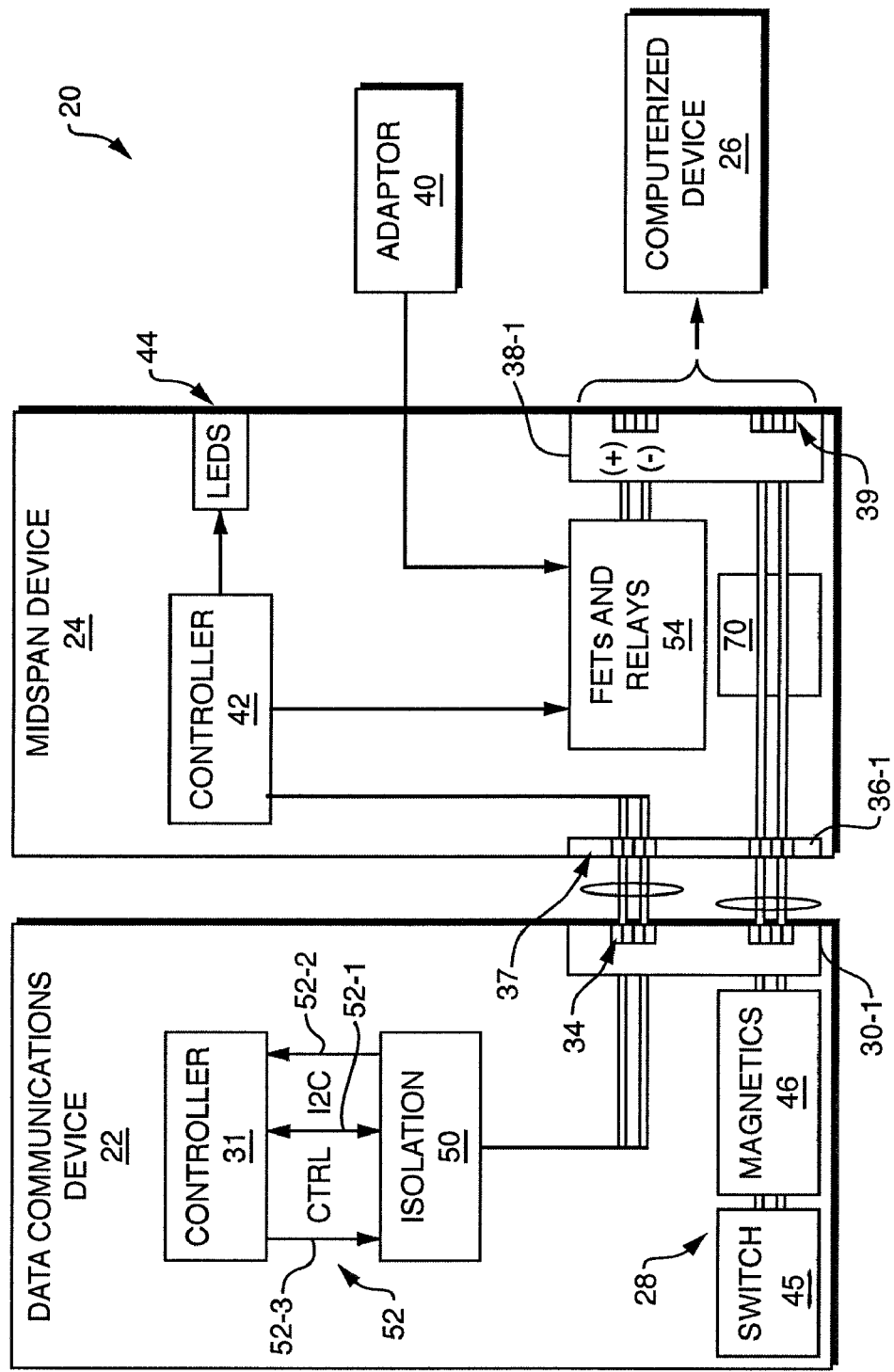
FIG. 2 illustrates a schematic representation of an exchange of signals among the data communications device, midspan device, and computerized device of FIG. 1A, according to one embodiment of the invention.

FIGS. 1A and 2 show a data communications system or network 20 that is suitable for use by the invention. The data communications network 20 includes a data communications device 22, a midspan device 24, a cable 25 that couples the data communications device 22 and midspan device 24, and powered devices 26 coupled to the data communications device 22 through the midspan device 24. In one arrangement, the data communication network 20 is configured as a VOIP network that allows the powered devices 26-1 through 26-4 (collectively computerized devices 26), such as IP telephones or IEEE 802.3af powered device interface controllers, to send and receive data signals such as audio, video, or text signals as Internet-Protocol signals.

In one arrangement, the data communications device 22 is configured as a router having a transceiver 28, a set of multi-terminal connectors 30, a controller 31, and a power adapter 32 configured to deliver power from a power source (not shown) to the data communications device 22.

The transceiver 28 of the data communications device 22 is configured to receive data packets from a computerized device 26 within the network 20 and, based on destination or other information included in the packets, route the data packets to one or more other computerized devices 26 within the network 20. For example, in one arrangement as shown in FIG. 2, the transceiver 28 is configured as a physical layer device, such as a switch 45 and magnetic interface 46, coupled to the set of multi-terminal connectors 30 that performs such data routing functions.

The controller 31 is configured to exchange control signals with the midspan device 24 to detect an operation status, and control certain operations of, the midspan device 24, as will be described in detail below. For example, as shown in FIG. 2, the controller 31, such as a memory and a processor, is electrically coupled to the set of multi-terminal connectors 30 by a signal isolation module 50 and is configured to exchange control signals 52 with the midspan device 24.

Figure 1B:
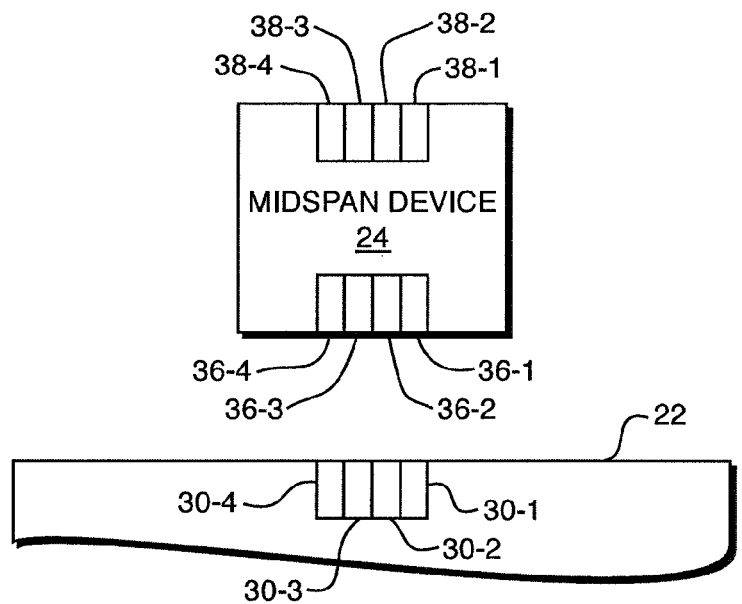
FIG. 1B illustrates the ports of the data communications device, according to one embodiment of the invention.

The set of multi-terminal connectors 30 is configured to couple with the midspan device 24 for exchange of data signals and control signals therewith. In one arrangement as indicated in FIGS. 1B and 2, the set of multi-terminal connectors 30 is configured as four RJ45 ports, where each port 30-1 through 30-4 includes eight terminals or pins 34. In one arrangement, one subset of the pins 34 are configured as data terminals that exchange data signals with the computerized devices 26 through the midspan device 24 while another subset of the pins 34 are configured as control terminals that exchange control signals with the midspan device 24. For example, as indicated in the table provided in the Appendix below, for each of the ports 30-1 through 30-4 of the set of multi-terminal connectors 30, the pair of pins 1 and 2 are configured to receive data signals from the midspan device 24, the pair of pins 3 and 6 are configured to transmit data signals to the midspan device 24, and the pairs of pins 4, 5, 7, and 8 are configured to carry control signals between the controller 31 of the data communications device 22 and the midspan device 24.

The midspan device 24, such as a POE module, is electrically coupled to the data communications device 22 and the computerized devices 26 and is configured to inject power signals within the network 20 to remotely power the computerized devices 26. The midspan device 24 is also configured to carry data signals between the data communications device 22 and the computerized devices 26. In one arrangement, the midspan device 24 includes a first set of multi-terminal connectors or input connectors 36, a second set of multi-terminal connectors or output connectors 38, a controller 42, and a power adapter 40. It should be noted that the terms "input" and "output" with reference to the sets of connectors 36, 38 are merely labels for ease of description. It should be apparent that the sets of connectors 36 can carry signals in ether direction between the data communications device 22 and the midspan device 24 and the sets of connectors 38 carry data signals in ether direction between the computerized device 26 and the midspan device 24.

The set of multi-terminal input connectors 36 couples to the data communications device 22 by the cable 25 and is configured to exchange data signals and control signals with the data communications device 22. In one arrangement as indicated in FIGS. 1B and 2, the set of multi-terminal input connectors 36 is configured as four RJ45 ports where each port 36-1 through 36-4 includes eight terminals or pins 37. In one arrangement, a first subset of the pins 37 are configured as data terminals that exchange data signals with the data communications device 22 and second subset of the pins 37 are configured as control terminals to exchange control signals with the data communications device 22. For example, for each of the ports 36-1 through 36-4, the pair of pins 1 and 2 are configured as data terminals to transmit data signals to the data communications device 22, the pair of pins 3 and 6 are configured as data terminals to receive data signals from the data communications device 22, and pins 4, 5, 7, and 8 are configured as control terminals to exchange control signals with the data communications device 22.

The set of multi-terminal output connectors 38 is configured to couple to the computerized devices 26 via cables 48 and is configured to exchange data signals with the computerized devices 26 and to deliver power to the computerized devices 26. In one arrangement as indicated in FIGS. 1B and 2, the set of multi-terminal output connectors 38 is configured as four RJ45 ports where each port 38-1 through 38-4 includes eight terminals or pins 39. In one arrangement, a first subset of the pins 39 are configured as data terminals to exchange data signals with the computerized devices 26 and second subset of the pins 39 are configured as power terminals to transmit power signals to the computerized devices 26. For example, for each of the ports 38-1 through 38-4 of the set of multi-terminal output connectors 38, the pins 1, 2, 3, and 6 are configured as data terminals to exchange data signals with the respective computerized devices 26, and the pins 4, 5, 7, and 8 are configured as power terminals to transmit power signals to the respective computerized devices 26.

The controller 42, such as a memory and processor, of the midspan device 24 is configured to provide state information to the data communications device 22 in response to receiving control signals from the device 22. For example, as the midspan device 24 provides power to the computerized devices 26, the controller 42, monitors the amount of power being provided to the devices 26 by powering devices, such as field effect transistors (FETs) and relays 54, associated with the midspan device 24, and transmits such information to the data communications device 22 via the control terminals on ports 36-1 through 36-4

As indicated above, the data communications device 22 and the midspan device 24 are electrically coupled by a cable 25 that is configured to carry data signals and control signals between the set of multi-terminal connectors 30 of the data communications device 22 and the set of multi-terminal input connectors 36 of the midspan device 24. In one arrangement, the cable 25 is configured as a multi-conductor cable, such as an unshielded twisted-pair (e.g., Ethernet) cable, having a first set of conductors configured to carry the data signals between the data communications device 22 and the midspan device 24 and having a second set of conductors configured to carry the control signal between the data communications device 22 and the midspan device 24.

The power adapter 40 is configured to electrically couple the midspan device 24 to a power source (not shown) and deliver power thereto. In one arrangement, as shown in FIG. 2, the adapter 40 electrically couples to field effect transistors and relays 54 associated with the midspan device 24, thereby allowing the midspan device 24 to provide power to the computerized devices 26.

In use, the midspan device 24 and data communications device 22 operate in conjunction with each other to provide power to the computerized devices 26. The following describes an example embodiment of the interconnection and operation of the midspan device 24 and data communications device 22 within the system 20.

Initially, the controller 31 of the data communications device 22 transmits detection signals to the control terminals of the set of multi-terminal connectors 30 to detect whether or not a midspan device 24 has been connected to the data communications device 22. In one arrangement, when the set of multi-terminal connectors 30 of the data communications device 22 is connected to the set of multi-terminal input connectors 36 of the midspan device 24, such as by the cable 25, the midspan device 24 receives the detection signals and transmits corresponding response signals to the data communications device 22 over the control signal conductors of the cable 25 (e.g., using otherwise unused pairs of conductors of the RJ-45 connectors). Based upon such an exchange, the data communications device 22 identifies the midspan device 24 and, as a result, transmits an initialization signal 52-1 to the midspan device 24, via the control terminals of the set of multi-terminal connectors 30 to initialize the controller 42 of the midspan device 24. Such initialization allows the controllers 31, 42 of the respective devices 22, 24 to communicate using a common communications protocol. For example, the controller 31 of the data communications device 22 initializes the controller 42 of the midspan device 24 using the I2C protocol, designed by Philips Semiconductors, that allows communications between controllers 31, 42 over a two wire synchronous serial connector, such as the cable 25.

Once initialized, the controller 42 of the midspan device 24 detects the presence or absence of computerized devices 26 connected to the set of multi-terminal output connectors 38. For example, the controller 42 can transmit detection signals to the power terminals of ports 38-1 through 38-4 of the set of multi-terminal output connectors 38. In the event that the controller 42 receives reply signals from one or more computerized devices 26 via the output connector 38, thereby indicating the interconnection of one or more computerized devices 26, the midspan device 24 transmits power signals to the computerized devices 26 via the power terminals of the ports 38-1 though 38-4. As the midspan device 24 transmits the power signals to the computerized devices 26, the midspan device 24 can also carry data signals between the data communications device 22 and the computerized devices 26.

When the midspan device 24 transmits the power signals to the computerized devices 26, the midspan device 24 also transmits reporting signals 52-2 to the data communications device 22, via the control terminals associated with ports 38-1 though 38-4. The reporting signals 52-2 indicate an amount of power delivered by the midspan device 24 to the computerized devices 26 over the network 20. As the data communications device 22 receives the reporting signals 52-2, the controller 31 monitors the reporting signals 52-2 to detect the overall amount of power distributed by the midspan device 24 and, in certain cases, control the amount of power distributed by the midspan device 24.

In one arrangement, during the monitoring process, the controller 31 compares the reporting signal 52-2 with a threshold value, such as a user set threshold value stored by the controller 31, which indicates a particular power distribution limit of the midspan device 24. For example, the threshold value can be equal to an amount of power that the power adapter 40 provides to the midspan device 24 but that is less than the power consumption requirement of the midspan device. Assume a case where the ports 38-1 through 38-4 of the set of multi-terminal output connectors 38 are configured to provide up to 15 Watts (W) per port, for a total of 60 W provided by the midspan device 24. In such a case, the adapter 40 provides an amount of power to the midspan device 24 that is less than the overall amount of power deliverable by the midspan device 24. For example, in one arrangement, the adapter 40 provides 40 W to the midspan device 24. As such, the threshold level can be set to equal 40 W, so as not to exceed the power limits of the adapter 40.

In use, assume the threshold value stored by the controller 31 is set to a limit of 40 W. When the midspan device 24 transmits reporting signals 52-2 to the data communications device 22 that indicate that the midspan device 24 is delivering a total of less than 40 W of power to the computerized devices 26, based upon a comparison of the reporting signals 52-2 with the threshold value, the controller 31 takes no action and allows the midspan device 24 to continue its operation. When the midspan device 24 transmits reporting signals 52-2 that indicate that the amount of power delivered by the midspan device 24 approaches or exceeds 40 W of power, based upon a comparison of the reporting signals 52-2 with the threshold value, the controller 31 transmits a control signal 52-3 to the midspan device 24 to reduce the power output of the device 24. For example, the controller 31 can transmit a control signal 52-3 that shuts down one or more of the ports 38-1 through 38-4 to prevent the midspan device 24 from transmitting power, thereby reducing the amount of power provided by the midspan device 24 over the network 20. Such a configuration of the data communications device 22 can regulate an overall amount of power provided by the midspan device 24 to reduce costs associated with operation of the midspan device 24 and network 20.

In one arrangement, the data communications device 22 is configured to adjust the amount of power provided by the ports 38-1 through 38-4 of the midspan device 24 based upon a presence or absence of a connection (e.g., a connection state) between the midspan device 24 and a computerized device 26. For example, during operation, the controller 31 of the data communications device 22 can transmit a state detection signal to the midspan device 24 to detect the presence or absence of connections between the ports 38-1 through 38-4 and associated computerized devices 26. In the case where the data communications device 22 detects the absence of a connection between a port 38-1 through 38-4 and a computerized device 26, the data communications device can transmit a control signal 52-3 that shuts down the non-connected port 38-1 through 38-4 to prevent the midspan device 24 from transmitting power therethrough. In the case where the data communications device 22 detects the presence of a connection between a previously non-connected port 38-1 through 38-4 and a computerized device 26, the data communications device can transmit a control signal 52-3 that causes the controller 42 to provide power to the previously non-connected port. Such a configuration of the data communications device 22 regulates the overall amount of power provided by the midspan device 24, thereby reducing costs associated with operation of the midspan device 24 and network 20.

While the data communications device 22 can be used to control an amount of power distributed by the midspan device 24 to the computerized devices 26 over the network 20, the data communications device can also be configured to control other aspects of the operation of the midspan device 24 as well. For example, as illustrated in FIG. 2, the midspan device 24 includes a status indicator 44 (e.g., shown as light emitting diodes or LEDs) in electrical communication with the controller 42 used to provide a user, such as a system administrator, with an indication of the operability or status of the midspan device 24.

In one arrangement, the status indicator 44 can provide a user with information relating to the state of the midspan device 24. For example, the status indicator 44 can indicate that the midspan device 24 either provides power or does not provide power to a connected computerized device 26. In another example, the status indicator 44 can also indicate that the midspan device's operability has been administratively powered down, to interrupt the ability to provide power to a computerized device 26. Also, the status indicator 44 can indicate the occurrence of a power delivery fault between the midspan device 24 and a connected computerized device 26.

While the status indicator 44 can have a variety of configurations, in one embodiment, the status indicator 44 is formed of one or more LEDs to provide a user with visual feedback regarding the operation of the midspan device 24. In one arrangement, the operation of the LEDs can correspond to different operational states of the midspan device 24. For example, the midspan device 24 can include LEDs associated with each of the ports 38-1 through 38-4 that indicate if the ports actively provide power to a computerized device 26 over the network 20. For example, an illuminated LED, such as associated with a first port 38-1, can indicate that the port 38-1 provides power to a connected computerized device 26 while a non-illuminated LED, such as associated with a second port 38-2, can indicate that the midspan device 24 does not provide power to a computerized device 26 via the port 38-2.

In one arrangement, the controller 31 of the data communications device 22 is configured to adjust an output of the status indicator 44 in response to the reporting signals 52-2 transmitted from the midspan device 24. As indicated above, the controller 42 of the midspan device 24 is configured to transmit, to the data communications device 22, a reporting signal 52-2 that indicates an amount of power transmitted by the midspan device 24 via the ports 38-1 through 38-4. The reporting signal, however, can also include information related to either the activity/non-activity of the ports or to the inability or failure of the controller 42 to transmit power over one or more of the ports. Based upon the reporting signal, the data communications device 22 can, in turn transmit a control signal to the midspan device 24 to either activate or deactivate the indicator 44. For example, in the case where the reporting signal 52-2 includes information related to the activity/non-activity of the ports, the control signal 52-3 can cause the controller 42 to activate the indicators 44 associated with the active ports (e.g., those ports actively transmitting power) and can cause the controller 42 to deactivate the indicators 44 associated with the inactive ports (e.g., those ports not transmitting power). In another example, in the case where the reporting signal 52-2 includes information related to the inability or failure of the controller 42 to transmit power over one or more of the ports, the control signal 52-3 can activate a status indicator indicating a potential failure of one of the ports 38-1 through 38-4.

Figure 3:
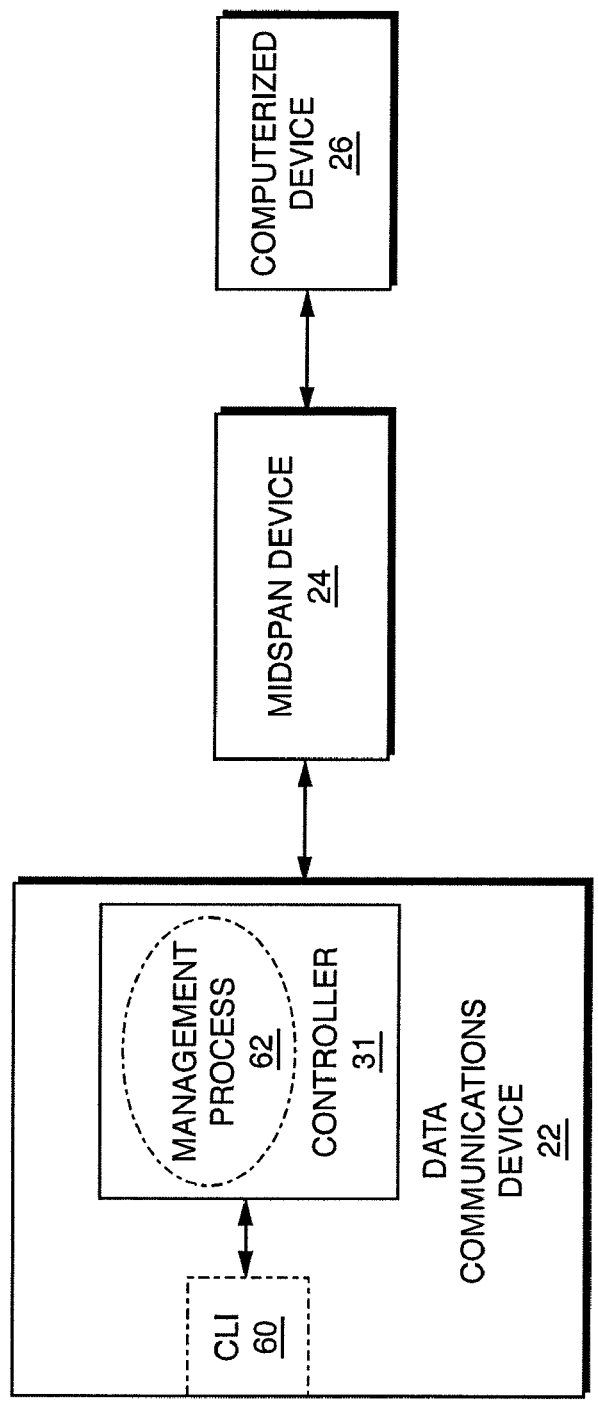
FIG. 3 illustrates the data communications system if FIG. 1A as it includes a command line interface and a management process, according to an embodiment of the invention.

As indicated above, the data communications device 22 provides external control to the midspan device 24 over the network 20. In one arrangement, as shown in FIG. 3, the data communications device 22 includes a user interface 60, such as a command line interface (CLI), and a midspan device management process 62 that allows a user to remotely configure or obtain a status of the midspan device 24. In one arrangement, the user interface 60 and management process 62 allows a user to remotely enable or disable any of the ports 38-1 of the midspan device 24 to either allow or prevent the selected port from powering an attached computerized device 26. For example, the user interface 60 can present the user with the command "power inline [auto/never]." User selection of the "auto" entry configures the management process 62 to automatically allow powering when a powered device 26 is detected at a port 38-1 through 38-4. User selection of the "never" entry configures the management process 62 to disable inline powering of the port. In another arrangement, the user interface 60 and management process 62 allow a user to obtain status information regarding the midspan device 24, such as whether or not a device 26 is attached to a port 38-1 through 38-4 and, if a device 26 is attached, the amount of power provided to that device 26.

While this invention has been particularly shown and described with references to preferred embodiments thereof, it will be understood by those skilled in the art that various changes in form and details may be made therein without departing from the spirit and scope of the invention as defined by the appended claims.

For example, while the set of multi-terminal connectors 30 of the data communications device 22 and the set of multi-terminal input connectors 36 and set of multi-terminal output connector 38 of the midspan device 24 are illustrated as having four ports, respectively, the sets of connectors 30, 36, 38 of the data communications device 22 and the midspan device 24 can be configured with a greater or fewer number of ports.

In another example, FIG. 2 illustrates the port 36-1 of the midspan device 24 as receiving data from the input port 30-1 of data communications device 22 and transmitting the data to a computerized device 26 via output port 38-1. Such illustration is by way of example only. Data signals are not required to pass between the ports 36, 38 of the midspan device using a one-to-one mapping scheme between the input and output ports 36, 38. In one embodiment, each input port 36-1 through 36-4 can transmit data to any of the output ports 38-1 through 38-4 associated with the midspan device 24. For example, as illustrated in FIG. 2, the midspan device 24 includes one or more switches 70 that interconnects the input ports 36 with the output ports 38 and that are configured to provide data communication among any combination of the input and output ports 36, 38.

What is claimed is:

1. A midspan device configured to provide power to a computerized device, the midspan device comprising:
   a first set of multi-terminal connectors configured to electrically couple with a data communications device, the first set of multi-terminal connectors having at least one data terminal configured to receive a data signal from the data communications device and at least one control terminal configured to exchange a control signal with the data communications device; and
   a second set of multi-terminal connectors configured to electrically couple with the computerized device, the second set of multi-terminal connectors having at least one data terminal configured to transmit the data signal to the computerized device and at least one power terminal configured to transmit a power signal to the computerized device,
   wherein the at least one control terminal is configured to transmit, to the data communications device, a reporting signal that indicates an amount of power transmitted by the second set of multi-terminal connectors;
   wherein the at least one control terminal is configured to receive, from the data communications device, the control signal being configured to control the amount of power transmitted by the second set of multi-terminal connectors to the computerized device;
   wherein:
   a set of RJ45 ports comprises the first set of multi-terminal connectors;
   the at least one data terminal of the first set of multi-terminal connectors is configured as a first pair of data terminals that transmit data signals to the data communications device and as a second pair of data terminals that receive data signals from the data communications device; and
   the at least one control terminal of the first set of multi-terminal connectors is configured as a first pair of control terminals and as a second pair of control terminals that exchange control signals with the data communications device.

2. The midspan device of claim 1, comprising:
   a status indicator; and
   a controller in electrical communication with the status indicator, the controller configured to (i) transmit, to the data communications device, the reporting signal that indicates the amount of power transmitted by the at least one power terminal and (ii) receive, from the data communications device, the control signal that causes the controller to adjust an output of the status indicator in response to the reporting signal.

3. The midspan device of claim 1, wherein the first set of multi-terminal input connectors couples to the data communications device by a multi-conductor cable having a first set of conductors configured to carry the data signal between the data communications device and the midspan device and having a second set of conductors configured to carry the control signal between the data communications device and the midspan device.

4. The midspan device of claim 3, wherein the multi-conductor cable comprises an unshielded twisted-pair cable.

5. The midspan device of claim 1, wherein the first set of multi-terminal connectors comprises at least two ports, each port having at least one data terminal configured to receive the data signal from the data communications device and at least one control terminal configured to exchange the control signal with the data communications device.

6. The midspan device of claim 1, wherein the second set of multi-terminal connectors comprises at least two ports, each port having least one data terminal configured to transmit the data signal to the computerized device and at least one power terminal configured to transmit the power signal to the computerized device.

7. The midspan device of claim 1, wherein the data communications device is not configured to provide power to the computerized device and midspan device is a power injection device configured to inject the power signal between the data communications device and the computerized device.

8. A data communications device configured to provide a data signal to a computerized device, the data communications device comprising:
   a controller configured to generate a control signal to control operation of a midspan device; and
   a set of multi-terminal connectors having at least one data terminal configured to transmit the data signal to the midspan device for delivery to the computerized device and having at least one control terminal configured to transmit the control signal to the midspan device,
   wherein the controller is configured to detect an amount of power provided to the computerized device by at least one power terminal of a set of multi-terminal connectors of the midspan device;
   wherein the controller is configured to adjust the amount of power provided to the computerized device by the at least one power terminal of the set of multi-terminal connectors of the midspan device based upon the detected amount of power provided by the midspan device;

wherein:

a set of RJ45 ports comprises the set of multi-terminal connectors of the data communications device;

the at least one data terminal of the set of multi-terminal connectors is configured as a first pair of data terminals that transmit data signals to the midspan device and as a second pair of data terminals that receive data signals from the midspan device; and the at least one control terminal of the set of multi-terminal connectors is configured as a first pair of control terminals and as a second pair of control terminals that exchange control signals with the midspan device.

9. The data communications device of claim 8, wherein the controller is configured to detect a connection state between the set of multi-terminal connectors of the midspan device and the computerized device.

10. The data communications device of claim 9, wherein the controller is configured to adjust the amount of power provided to the computerized device via the at least one power terminal of the set of multi-terminal connectors of the midspan device based upon the connection state.

11. The data communications device of claim 8, wherein the set of multi-terminal connectors of the data communications device is coupled to the midspan device by a multi-conductor cable having a first set of conductors configured to carry the data signal between the data communications device and the midspan device and having a second set of conductors configured to carry the control signal between the data communications device and the midspan device.

12. The data communications device of claim 11, wherein the multi-conductor cable comprises an unshielded twisted-pair cable.

13. The data communications device of claim 8, wherein the set of multi-terminal connectors comprises at least two ports, each port having least one data terminal configured to transmit the data signal to the midspan device and at least one control terminal configured to exchange the control signal with the midspan device.

14. A data communications system comprising:

a data communications device; and a midspan device electrically coupled to the data communications device;

the data communications device comprising:

a controller configured to generate a control signal to control operation of the midspan device; and a set of multi-terminal connectors having at least one data terminal configured to transmit data signal to the midspan device for delivery to a computerized device and having at least one control terminal configured to transmit the control signal to the midspan device; and the midspan device comprising:

a first set of multi-terminal connectors configured to electrically couple with the data communications device, the first set of multi-terminal connectors having at least one data terminal configured to receive the data signal from the data communications device and at least one control terminal configured to exchange the control signal with the data communications device; and a second set of multi-terminal connectors configured to electrically couple with the computerized device, the second set of multi-terminal connectors having at least one data terminal configured to transmit the data signal to the computerized device and at least one power terminal configured to transmit a power signal to the computerized device, wherein the controller of the data communications device is configured to detect an amount of power provided by the at least one power terminal of the second set of multi-terminal connectors of the midspan device to the computerized device;

wherein the controller is configured to adjust the amount of power provided by the at least one power terminal of the second set of multi-terminal connectors of the midspan device to the computerized device based upon the detected amount of power provided by the midspan device;

wherein:

a set of RJ45 ports comprises the set of multi-terminal connectors;

the at least one data terminal of the set of multi-terminal connectors is configured as a first pair of data terminals that transmit data signals to the midspan device and as a second pair of data terminals that receive data signals from the midspan device; and the at least one control terminal of the set of multi-terminal connectors is configured as a first pair of control terminals and as a second pair of control terminals that exchange control signals with the midspan device.

15. The data communications system of claim 14, wherein the controller of the data communications device is configured to detect a connection state between the midspan device and the computerized device.

16. The data communications system of claim 15, wherein the controller is configured to adjust the amount of power provided by the at least one power terminal of the second set of multi-terminal connectors of the midspan device to the computerized device based upon the connection state.

17. The data communications system of claim 14, wherein the midspan device comprises:

a status indicator; and a controller in electrical communication with the status indicator, the controller configured to (i) transmit, to the data communications device, a reporting signal that indicates the amount of power transmitted by the at least one power terminal and (ii) receive, from the data communications device, the control signal that causes the controller to adjust an output of the status indicator in response to the reporting signal.

18. In a data communications device, a method for controlling an amount of power delivered to a computerized device by a midspan device, comprising:

coupling a set of multi-terminal connectors of a set of RJ45 ports of the data communications device to the midspan device;

receiving, via at least one control terminal having a first pair of control terminals and a second pair of control terminals of the set of multi-terminal connectors, a reporting signal from the midspan device indicating an amount of power transmitted by the midspan device to the computerized device; and in response to the reporting signal, transmitting, via the at least one control terminal having the first pair of control terminals and the second pair of control terminals of the set of multi-terminal connectors, a control signal to the midspan device to shut down at least one set of multi-terminal connectors of the midspan device, the at least one set of multi-terminal connectors electrically coupled with the computerized device.

19. The method of claim 18 further comprising:

comparing a power value indicated by the reporting signal received from the midspan device with a threshold value; and generating the control signal when the power value approaches the threshold value.

20. The method of claim 18, comprising adjusting an output of a status indicator associated with the midspan device in response to receiving the reporting signal.

* * * * *